(12) United States Patent
Choi et al.

(10) Patent No.: US 10,890,328 B2
(45) Date of Patent: Jan. 12, 2021

(54) FIN-PIN FLOW GUIDE FOR EFFICIENT TRANSITION PIECE COOLING

(71) Applicant: DOOSAN HEAVY INDUSTRIES & CONSTRUCTION CO., LTD., Changwon-si (KR)

(72) Inventors: Jung Jin Choi, Palm Beach Gardens, FL (US); Yunyoung Doh, Gyeongnam (KR); Donggon Lee, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 144 days.

(21) Appl. No.: 16/204,709

(22) Filed: Nov. 29, 2018

(65) Prior Publication Data

US 2020/0173294 A1     Jun. 4, 2020

(51) Int. Cl.
*F23R 3/26* (2006.01)
*F01D 9/02* (2006.01)

(52) U.S. Cl.
CPC ............ *F23R 3/26* (2013.01); *F01D 9/023* (2013.01); *F23R 2900/03043* (2013.01); *F23R 2900/03045* (2013.01)

(58) Field of Classification Search
CPC .. F01D 9/023; F23R 2900/03043; F23R 3/26; F23R 2900/03045; F23R 2900/03044; F05D 2240/127; F05D 2260/22141
See application file for complete search history.

(56) References Cited

U.S. PATENT DOCUMENTS

| 8,201,412 | B2* | 6/2012 | Dugar | F23R 3/002 60/39.37 |
| 8,955,330 | B2* | 2/2015 | Narcus | F23R 3/002 60/752 |
| 9,200,526 | B2 | 12/2015 | Ito et al. | |
| 9,360,217 | B2* | 6/2016 | DiCintio | F23R 3/005 |
| 9,982,893 | B2* | 5/2018 | Rodriguez | F23R 3/425 |
| 2006/0042255 | A1* | 3/2006 | Bunker | F01D 25/14 60/752 |
| 2006/0130484 | A1* | 6/2006 | Marcum | F23R 3/002 60/752 |
| 2008/0282667 | A1* | 11/2008 | Intile | F01D 9/023 60/39.37 |
| 2009/0252593 | A1* | 10/2009 | Chila | F02C 7/18 415/58.4 |
| 2010/0003128 | A1* | 1/2010 | Chila | F01D 25/12 415/182.1 |

(Continued)

FOREIGN PATENT DOCUMENTS

JP     2012057618 A     3/2012
KR   10-2015-0047435 A   5/2015

*Primary Examiner* — William H Rodriguez
(74) *Attorney, Agent, or Firm* — INVENSTONE Patent, LLC

(57) ABSTRACT

A transition piece can include: an inner transition piece including an inlet and an outlet; an outer transition piece surrounding the inner transition piece with a flow passage; an outlet fin-pin flow guide disposed on the inner transition piece and located closer to the outlet than the inlet; a first bottom fin disposed at a bottom portion of the inner transition piece; and a second bottom fin disposed at the bottom portion of the inner transition piece, wherein the first bottom fin and the second bottom fin are arranged to be inclined to each other at an acute angle.

16 Claims, 11 Drawing Sheets

(56) References Cited

U.S. PATENT DOCUMENTS

| | | | | |
|---|---|---|---|---|
| 2010/0034643 A1* | 2/2010 | Davis, Jr. | F01D 9/023 | 415/144 |
| 2010/0071382 A1* | 3/2010 | Liang | F23R 3/06 | 60/806 |
| 2010/0170258 A1* | 7/2010 | Chila | F23R 3/04 | 60/755 |
| 2010/0170259 A1* | 7/2010 | Huffman | F01D 9/023 | 60/755 |
| 2010/0224353 A1* | 9/2010 | Berry | F01D 9/023 | 165/185 |
| 2011/0061393 A1* | 3/2011 | Jorgensen | F01D 9/023 | 60/752 |
| 2011/0239654 A1* | 10/2011 | Bland | F23R 3/002 | 60/752 |
| 2012/0121381 A1* | 5/2012 | Charron | F01D 25/12 | 415/115 |
| 2012/0167571 A1* | 7/2012 | Cihlar | F01D 9/023 | 60/746 |
| 2012/0247111 A1* | 10/2012 | Narcus | F23R 3/005 | 60/752 |
| 2012/0324897 A1* | 12/2012 | McMahan | F23R 3/005 | 60/752 |
| 2014/0238029 A1* | 8/2014 | Sutcu | F23R 3/10 | 60/754 |
| 2014/0260272 A1* | 9/2014 | Dicintio | F01D 9/023 | 60/739 |
| 2014/0260273 A1* | 9/2014 | Melton | F23R 3/002 | 60/739 |
| 2015/0267918 A1* | 9/2015 | Maurer | F02C 3/04 | 60/726 |
| 2017/0370235 A1* | 12/2017 | Konishi | F02C 3/04 | |
| 2018/0106155 A1* | 4/2018 | Schiavo | F01D 9/023 | |
| 2018/0292090 A1* | 10/2018 | Dyer | F23R 3/007 | |
| 2019/0078470 A1* | 3/2019 | Park | F01D 9/023 | |
| 2019/0107054 A1* | 4/2019 | Park | F23R 3/44 | |

\* cited by examiner

Prior Art

1410

Prior Art

1510

Prior Art

FIN-PIN FLOW GUIDE FOR EFFICIENT TRANSITION PIECE COOLING

BACKGROUND OF THE INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the fuel-air mixture. The combusted gas generated from the combustor is discharged to the turbine and the turbine is rotated by the combusted gas, thereby generating power. The generated power is used in various fields such as for the generation of electricity and for driving machineries. The gas turbine is used to drive a generator, an aircraft, a locomotive, and the like.

The combustor further comprises a transition piece between a combustion chamber combusting the fuel-air mixture and the turbine. The transition piece guides hot combusted gas from the combustor to the turbine, thus it needs to be cooled effectively to inhibit the combustor or the engine from failing. Cooling the transition piece is a challenge due to high temperature of the combusted gas. Though an inner surface of the transition piece can be coated with a Thermal Barrier Coating (TBC) material, the TBC does not guarantee proper shielding of the transition piece from hot gas because the temperature can exceed the metal melting temperature. The transition piece can comprise a flow sleeve for cooling, but this structure increases the combustor pressure drop and thus lowers engine performance. In addition, this sleeve transition piece occupies more space in the engine. Other cooling schemes such as diffusion bonding design or transient liquid phase bonding allow less air to be leaked through the transition piece compared to effusion cooling and reduce the impact on pressure drop. The cooling performance of this system is, however, much lower than pure effusion cooling. In addition, this system requires more maintenance. In a conventional transition piece, cooling air is supplied between the inner transition piece and an outer transition piece of the transition piece through the holes of the outer transition piece. However, the cooling air supplied at the exit portion and moving upstream and the cooling air supplied at the middle portion and moving downstream cancel out flow momentum. Therefore, flow stagnation of the cooling air occurs around the exit portion of the transition piece, and it is observed that a hot spot forms on a top side of the inner transition piece.

BRIEF SUMMARY OF THE INVENTION

The present invention relates to a combustor, more particularly, to a transition piece including a fin-pin flow guide redirecting and redistributing the flow of the cooling air.

In an embodiment of the present invention, a transition piece can include: an inner transition piece including an inlet and an outlet; an outer transition piece surrounding the inner transition piece; a flow passage between the inner transition piece and the outer transition piece; and an outlet fin-pin flow guide disposed in the flow passage and located closer to the outlet than the inlet, wherein the outlet fin-pin flow guide is slanted with respect to a center line representing an imaginary line between an inlet center of the inlet and an outlet center of the outlet.

In another embodiment of the present invention, a transition piece can include: an inner transition piece including an inlet and an outlet; an outer transition piece surrounding the inner transition piece with a flow passage; an outlet fin-pin flow guide disposed on the inner transition piece and located closer to the outlet than the inlet; a first bottom fin disposed at a bottom portion of the inner transition piece; and a second bottom fin disposed at the bottom portion of the inner transition piece, wherein the first bottom fin and the second bottom fin are arranged to be inclined to each other at an acute angle.

In yet another embodiment of the present invention, a transition piece can include: an inner transition piece including an inlet and an outlet; an outer transition piece surrounding the inner transition piece; an outlet fin-pin flow guide disposed on the inner transition piece and located closer to the outlet than the inlet; and a top fin-pin flow guide disposed at a top portion of the inner transition piece, wherein the top fin-pin flow guide is disposed between the inlet and the outlet fin-pin flow guide.

DETAILED DISCLOSURE OF THE INVENTION

Figure 1A:
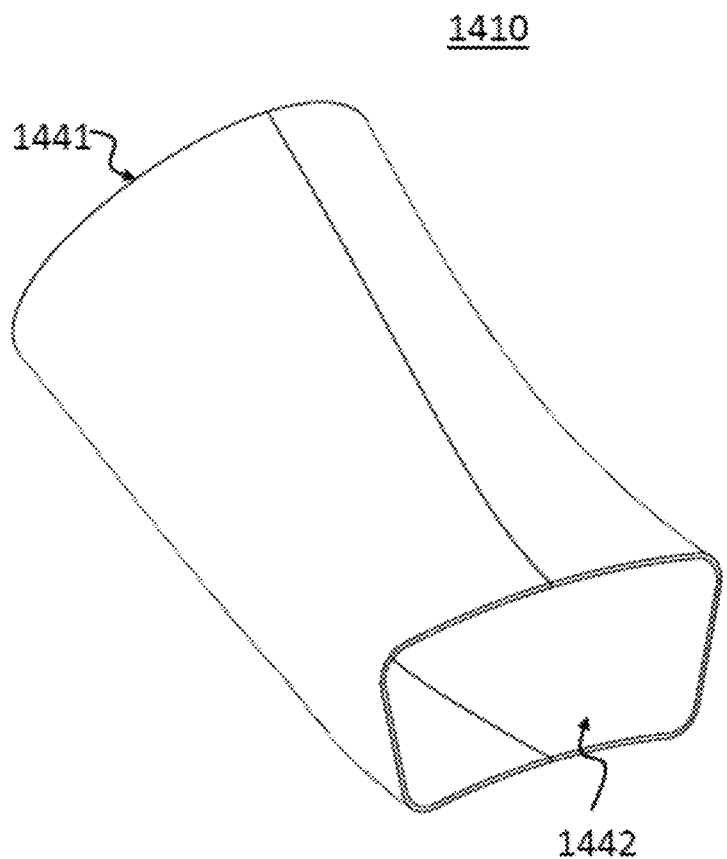
FIG. 1(a) shows an inner transition piece of a gas turbine.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 1B:
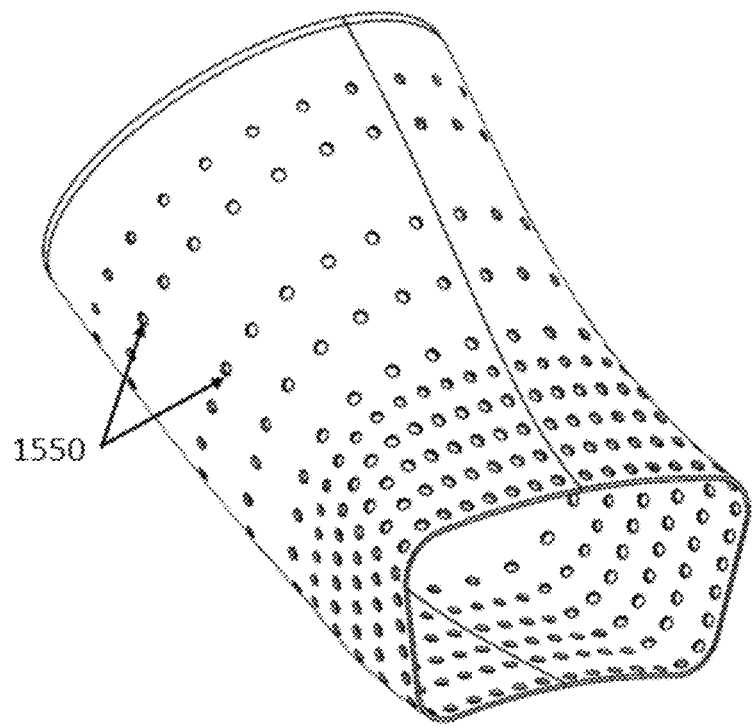
FIG. 1(b) shows an outer transition piece of a gas turbine.
Figure 1C:
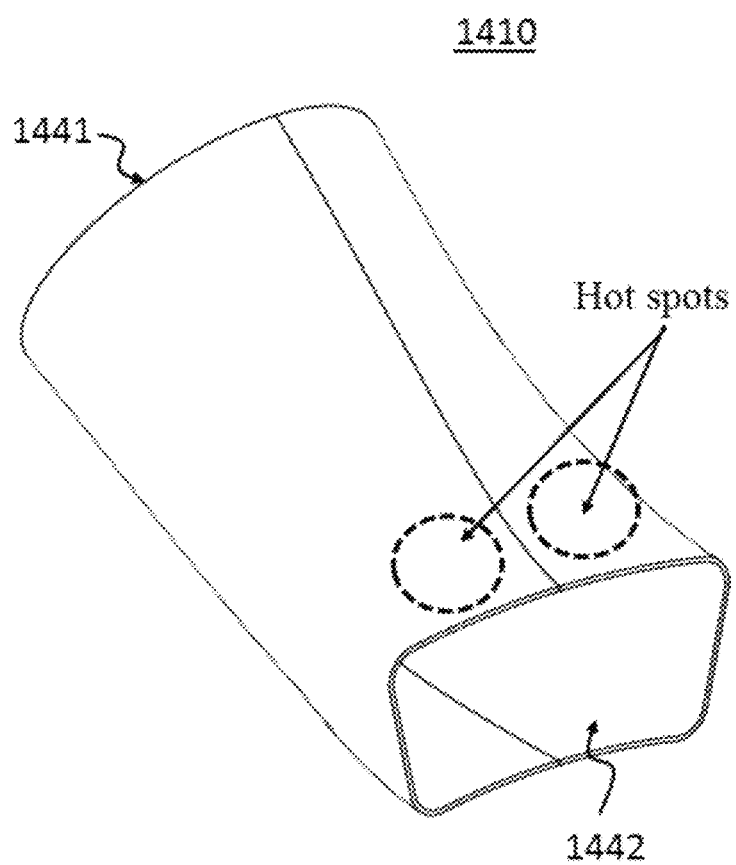
FIG. 1(c) shows heat distribution in a transition piece of a gas turbine.

Reference will be made to the attached figures on which the same reference numerals are used throughout to indicate the same or similar components. FIGS. 1(a), 1(b), and 1(c) show an inner transition piece, an outer transition piece, and heat distribution in a transition piece of a gas turbine, respectively. Referring to FIGS. 1(a), 1(b), and 1(c), an inner transition piece 1410 receives the hot combusted gas from a combustion chamber of a combustor through an inlet 1441 and provides the hot combusted gas to the turbine through an outlet 1442. An outer transition piece 1510 surrounding the inner transition piece 1410 includes a plurality of holes 1550 in order to provide cooling air to the inner transition piece 1410. However, even if the cooling air is provided through the plurality of holes 1550, the cooling air does not flow efficiently but is stagnated; therefore the hot spots occur around the outlet 1442.

Figure 2:
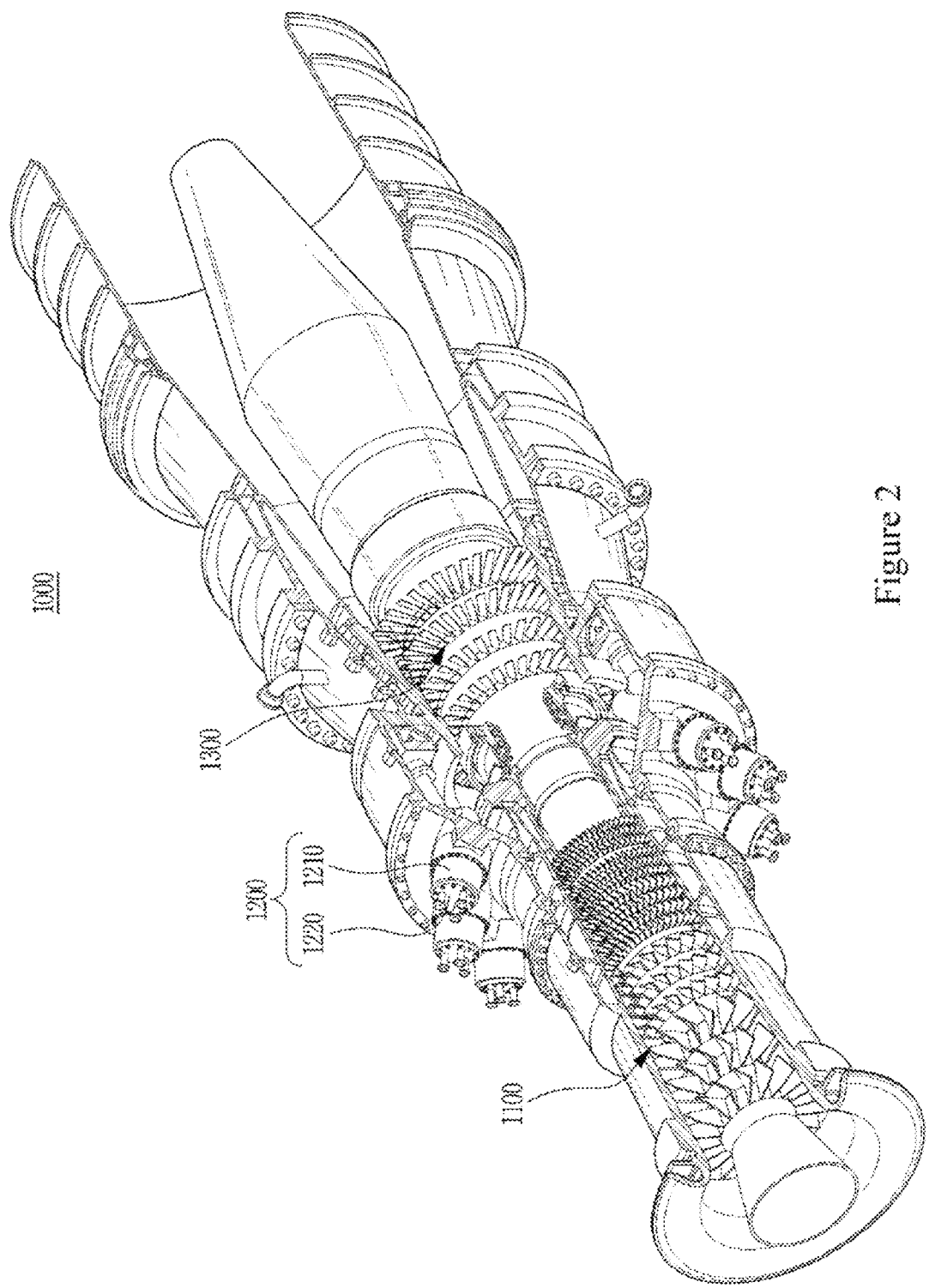
FIG. 2 shows a gas turbine according to an embodiment of the present invention
Figure 3:
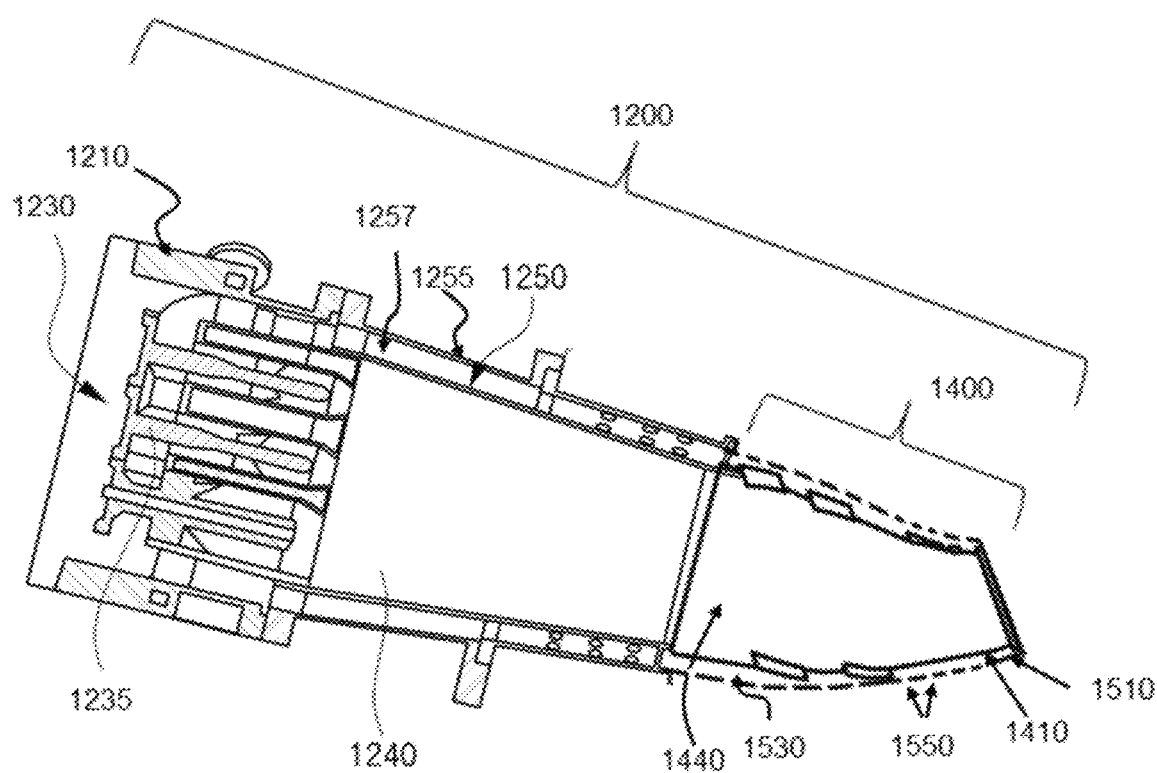
FIG. 3 shows a cross-sectional view of a combustor according to an embodiment of the present invention.

FIG. 2 shows a gas turbine according to an embodiment of the present invention. FIG. 3 shows a combustor according to an embodiment of the present invention. Referring to FIGS. 2 and 3, a gas turbine 1000 according to the embodiment of the present invention comprises a compressor 1100, a combustor 1200, and a turbine 1300. The compressor 1100 includes a plurality of blades, which are arranged in a radial fashion. The compressor 1100 rotates the plurality of blades, and air is thus moved while being compressed due to the rotation of the plurality of blades. In an embodiment, the compressor 1100 may be directly or indirectly connected to the turbine 1300 so as to receive some of the power generated by the turbine 1300, which is in turn used to rotate the plurality of blades.

The air compressed in the compressor 1100 is moved to the combustor 1200. The combustor 1200 includes a plurality of casings 1210 and a plurality of burners 1220, which are arranged in a circular pattern.

The combustor 1200 comprises a head end plate 1230, a combustion chamber 1240, an inner liner 1250, an outer liner 1255, a liner channel 1257, and a transition piece 1400. The outer liner 1255 defines an external wall of the combustion chamber 1240 and extends in one direction. The outer liner 1255 may be configured to have a cylindrical shape. The inner liner 1250 defines the combustion chamber 1240 and is spaced apart from the outer liner 1255 such that the liner channel 1257 is formed between the inner liner 1250 and the outer liner 1255. The casing 1210 and the head end plate 1230 cover the combustion chamber 1240 such that the compressed air provided by the compressor 1100 passes through the liner channel 1257 and then is introduced into the combustion chamber 1240.

The fuel is provided through a fuel nozzle 1235 to the combustion chamber 1240. The compressed air is mixed with the fuel and then is ignited in the combustion chamber 1240 by means of a spark plug (not shown). Subsequently, the combusted gas is discharged to the turbine 1300 so as to rotate the turbine blade through the transition piece 1400 disposed between the combustion chamber 1240 and the turbine 1300.

The combustor 1200 is exposed to a very high temperature condition; thus, the combustor 1200 needs to be cooled down appropriately. However, the combusted gas of the combustor 1200 should remain at high temperature at an inlet of the turbine 1300 in order to increase the efficiency of the gas turbine 1000. The temperature of the combusted gas is measured at the inlet as a turbine inlet temperature (TIT), and the gas turbines are classified based on the TIT because the TIT is an important factor. To increase TIT, the temperature of the combusted gas should be increased, and the high temperature of the combusted gas increases the temperatures of the combustor 1200, the turbine 1300, and the transition piece 1400 of the combustor 1200.

The hot combusted gas is generated in the combustion chamber 1240 and then passes through a gas channel 1440 of the transition piece 1400 and finally enters into the turbine 1300. Therefore, the inner liner 1250 and the inner transition piece 1410 are directly exposed to the hot combusted gas, and proper cooling is necessary. For cooling, an outer transition piece 1510 of the transition piece 1400 comprises a plurality of holes 1550 through which cooling air is supplied. The cooling air provided through the plurality of holes 1550 flows in a flow passage 1530 between the inner transition piece 1410 and the outer transition piece 1510, and a fin-pin flow guide disposed in the flow passage 1530 helps the cooling air flow without stagnation.

Figure 4:
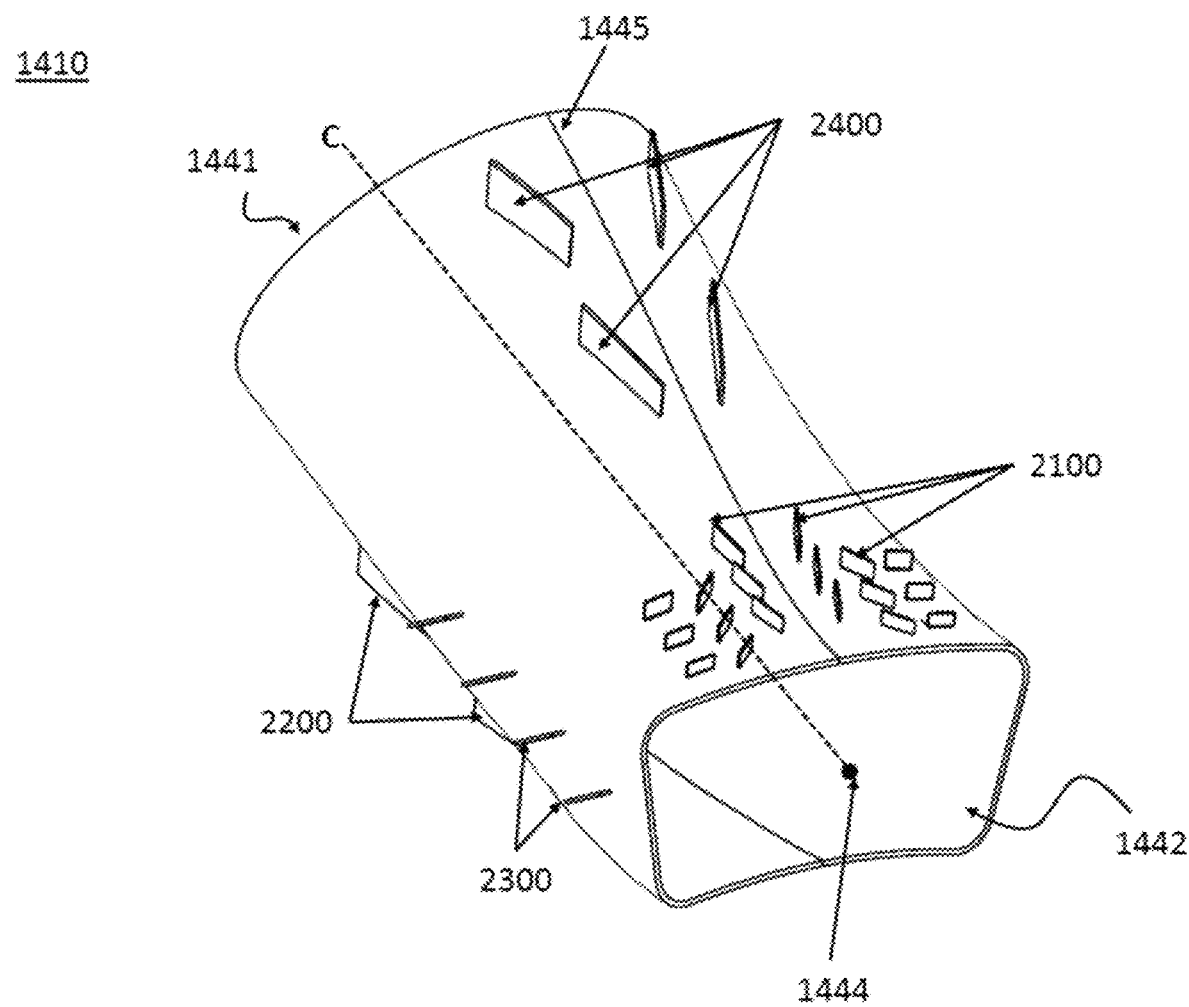
FIG. 4 shows an inner transition piece according to an embodiment of the present invention.
Figure 5:
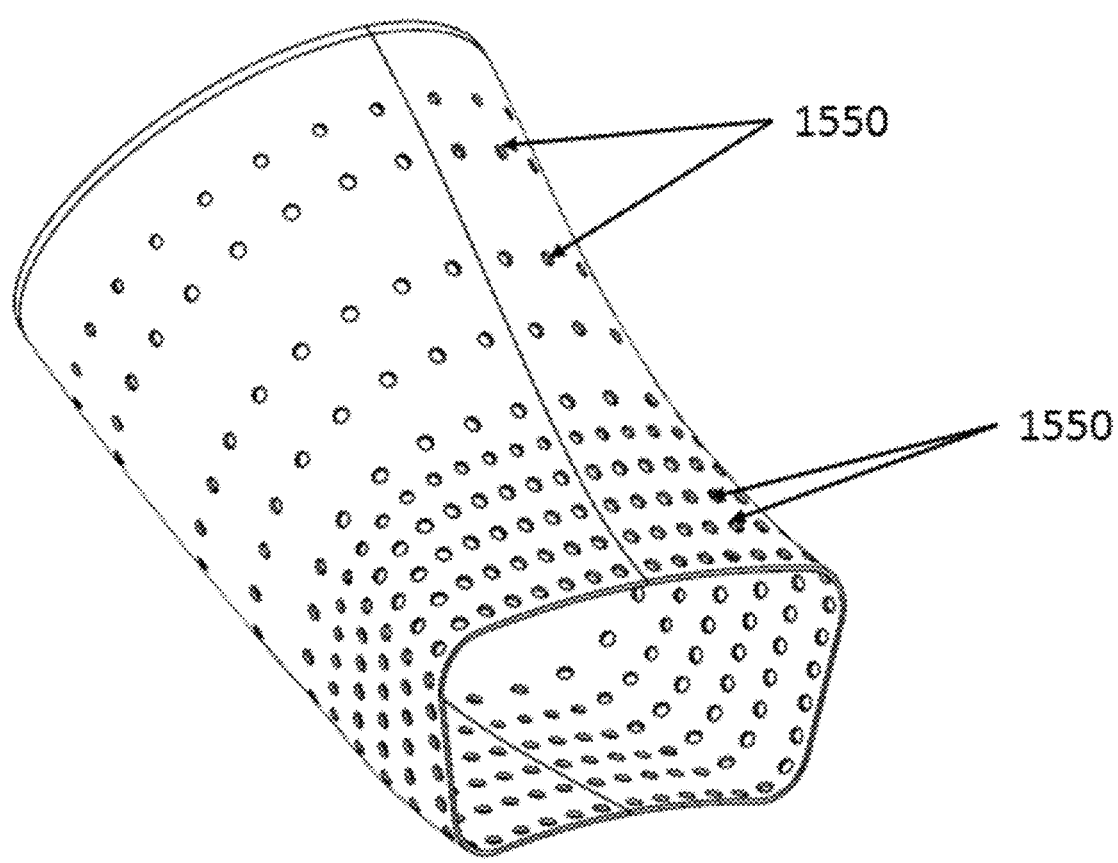
FIG. 5 shows an outer transition piece according to an embodiment of the present invention.
Figure 6:
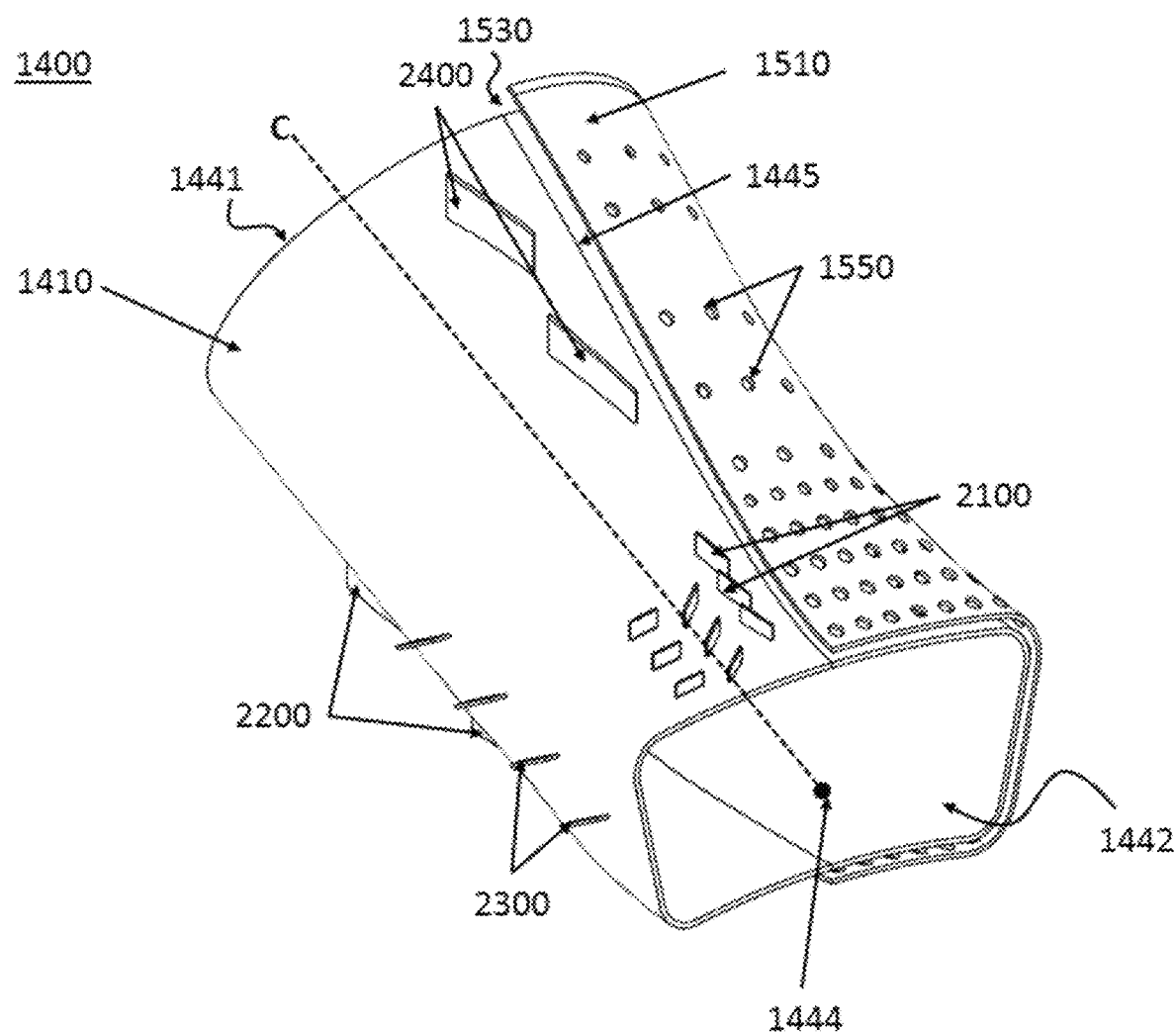
FIG. 6 shows an iso-view of a transition piece according to an embodiment of the present invention.

FIG. 4 shows an inner transition piece according to an embodiment of the present invention, FIG. 5 shows an outer transition piece according to an embodiment of the present invention, and FIG. 6 shows an iso-view of a transition piece according to an embodiment of the present invention.

Referring to FIGS. 4-6, the transition piece 1400 comprises the inner transition piece 1410, the outer transition piece 1510 surrounding the inner transition piece 1410, the flow passage 1530 between the inner transition piece 1410 and the outer transition piece 1510, and a fin-pin flow guide disposed in the flow passage 1530. The fin-pin flow guide is disposed on the inner transition piece 1410, but the fin-pin flow guide can be disposed on the outer transition piece 1510.

The inner transition piece 1410 comprises an inlet 1441 receiving the combusted gas and an outlet 1442 discharging the combusted gas. The inner transition piece 1410 comprises an outlet fin-pin flow guide 2100 located around the outlet 1442. That is, the outlet fin-pin flow guide 2100 is placed to be closer to the outlet 1442 than the inlet 1441 and redistributes a cooling air around the outlet 1442 so as that the cooling air flows well around the outlet 1442. In addition, the inner transition piece 1410 comprises a bottom fin-pin flow guide 2200 disposed at a bottom portion, a side fin-pin flow guide 2300 disposed at a side portion, and a top fin-pin flow guide 2400 disposed at a top portion.

The transition piece 1400 has a center line C representing an imaginary line between an inlet center of the inlet 1441 and an outlet center 1444 of the outlet 1442, and the inner transition piece 1410 has an inner center line 1445 corresponding to the center line C.

A density of the plurality of holes 1550 at a region corresponding to the top fin-pin flow guide 2400 can be lower than a density of the plurality of holes 1550 at a region corresponding to the outlet fin-pin flow guide 2100.

Figure 7:
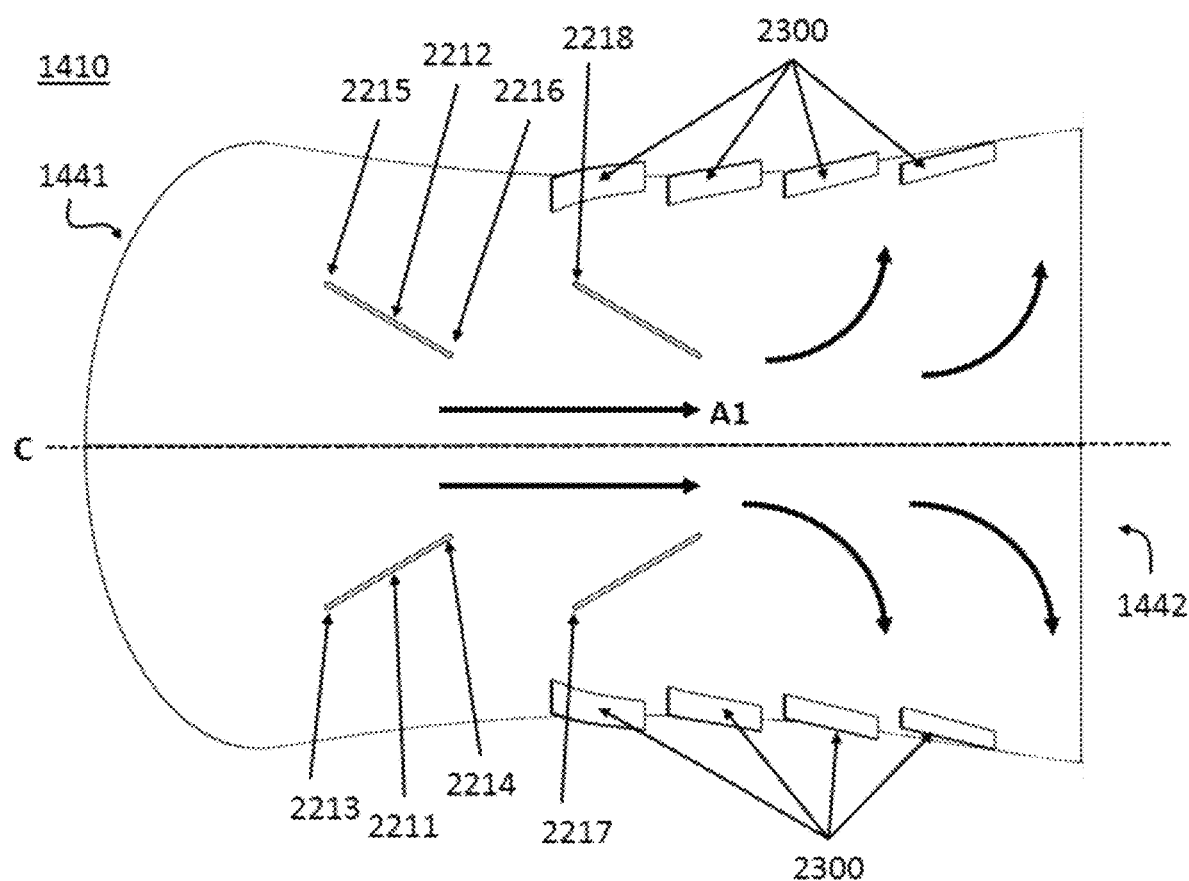
FIG. 7 shows a bottom view of an inner transition piece according to an embodiment of the present invention.

FIG. 7 shows a bottom view of an inner transition piece according to an embodiment of the present invention. Referring to FIGS. 4-7, the bottom fin-pin flow guide 2200 comprises a plurality of bottom fins including a first bottom fin 2211 and a second bottom fin 2212. The first bottom fin 2211 and the second bottom fin 2212 are disposed at a bottom portion of the inner transition piece 1410, and each of the first bottom fin 2211 and the second bottom fin 2212 is arranged to be slanted with respect to the center line C. Each of the first bottom fin 2211 and the second bottom fin 2212 is neither parallel to the center line C nor perpendicular to the center line C. In particular, the first bottom fin 2211 and the second bottom fin 2212 are arranged such that a first distance between a first end 2213 of the first bottom fin 2211 and a first end 2215 of the second bottom fin 2212 is larger than a second distance between a second end 2214 of the first bottom fin 2211 and a second end 2216 of the second bottom fin 2212. That is, the first bottom fin 2211 and the second bottom fin 2212 are arranged to be inclined to each other at an acute angle. The first ends 2213 and 2215 are closer to the inlet 1441 than the second ends 2214 and 2216 are, and the second ends 2214 and 2216 are closer to the outlet 1442 than the first ends 2213 and 2215 are. Therefore, the cooling air flows downwards from the inlet 1441 to the outlet 1442 at the bottom portion of the inner transition piece 1410 as the arrows A1 indicate. The first bottom fin 2211 and the second bottom fin 2212 are disposed at an opposite sides of the inner transition piece 1410 with respect to the center line C, and the first bottom fin 2211 and the second bottom fin 2212 are symmetric to each other against the center line C. The bottom fin-pin flow guide 2200 further comprises a third bottom fin 2217 next to the first bottom fin 2211 and a fourth bottom fin 2218 next to the second bottom fin 2212, wherein the third bottom fin 2217 is parallel to the first bottom fin 2211, and the fourth bottom fin 2218 is parallel to the second bottom fin 2212.

Figure 8:
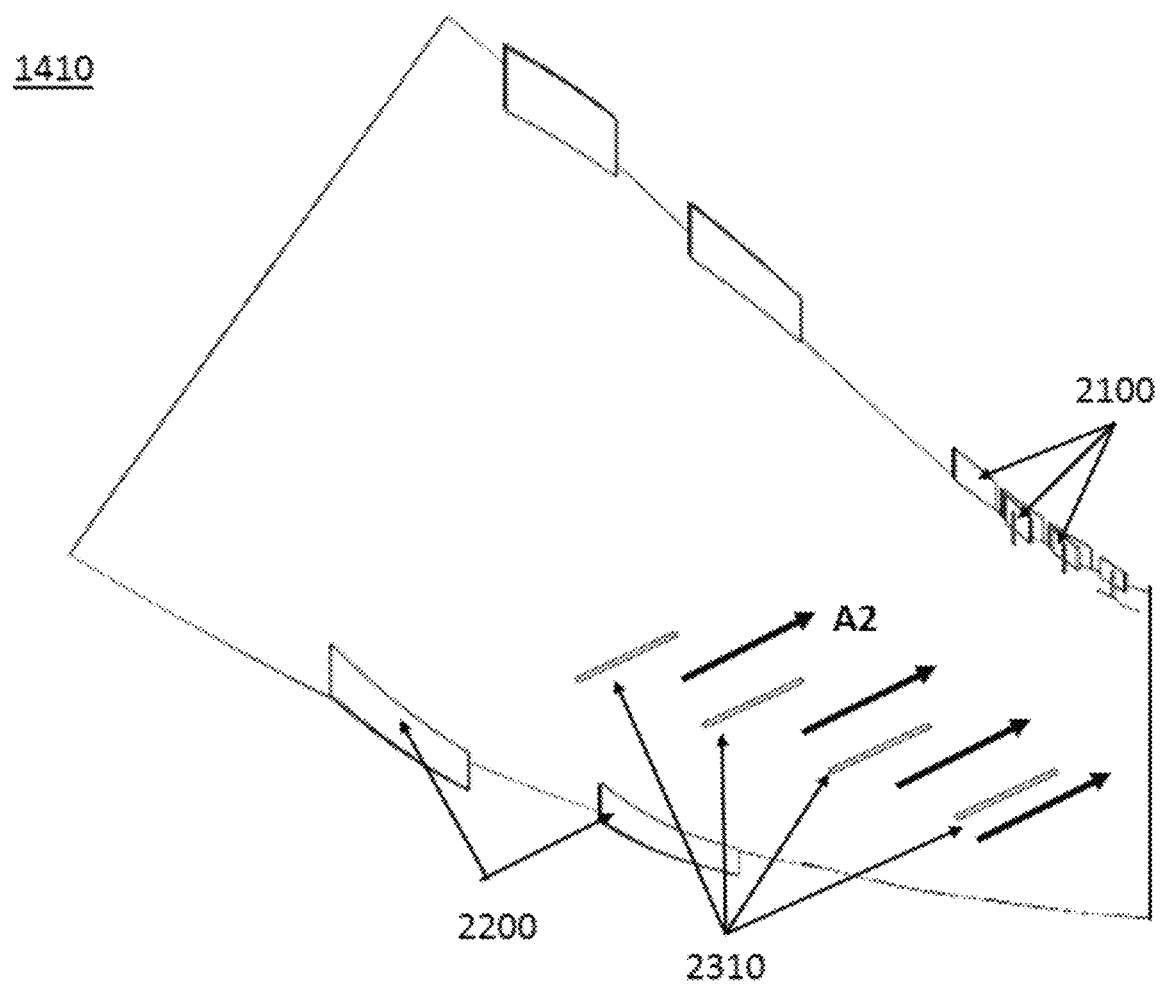
FIG. 8 shows a side view of an inner transition piece according to an embodiment of the present invention.

FIG. 8 shows a side view of an inner transition piece according to an embodiment of the present invention. Referring to FIGS. 4-8, the side fin-pin flow guide 2300 comprises a plurality of side fins 2310 disposed at the side portion of the inner transition piece 1410. Each of the plurality of side fins 2310 is arranged in a direction from the bottom fin-pin flow guide 2220 to the outlet fin-pin flow guide 2100, thereby allowing the cooling air to flow from the bottom fin-pin flow guide 2220 to the outlet fin-pin flow guide 2100 as indicated by the arrows A2.

Figure 9:
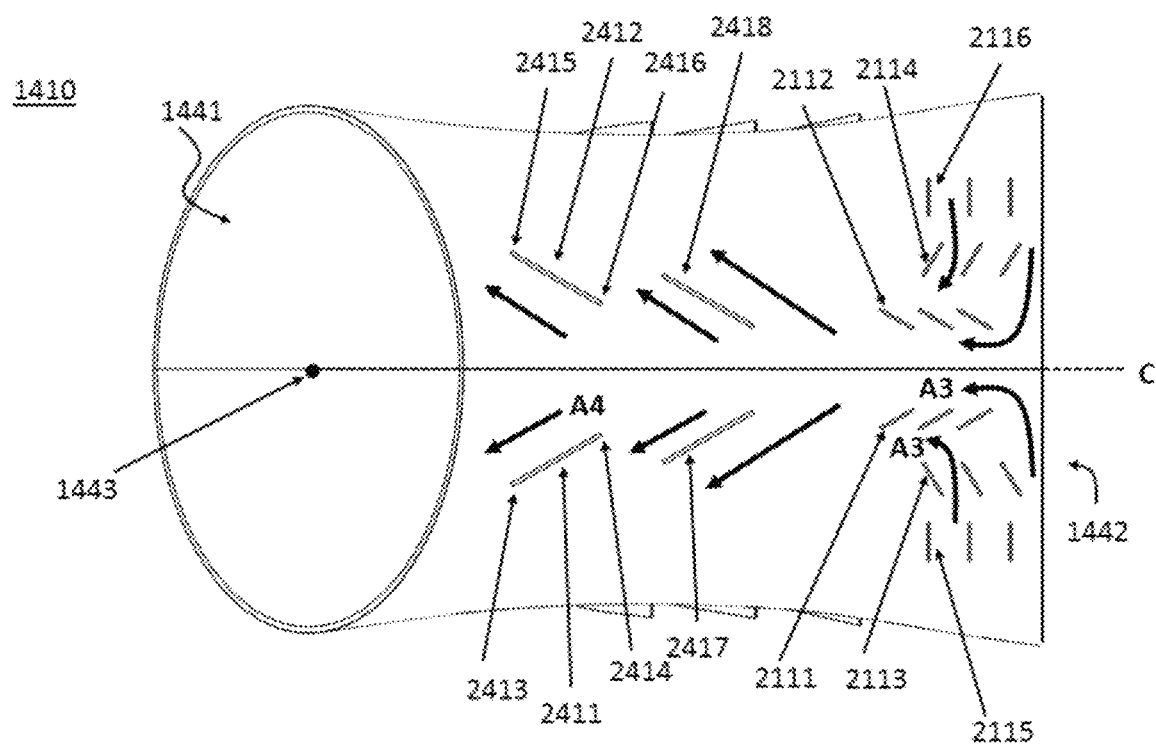
FIG. 9 shows a top view of an inner transition piece according to an embodiment of the present invention.

FIG. 9 shows a top view of an inner transition piece according to an embodiment of the present invention. Referring to FIGS. 4-9, the outlet fin-pin flow guide 2100 and the top fin-pin flow guide 2400 are disposed at the top portion of the inner transition piece 1410. The outlet fin-pin flow guide 2100 comprises a first outlet fin 2111 and a second outlet fin 2112 that are disposed on different sides with respect to the center line C connecting the inlet center 1443 of the inlet 1441 and the outlet center 1444 of the outlet 1442. Each of the first outlet fin 2111 and the second outlet fin 2112 is slanted with respect to the center line C such that the first outlet fin 2111 and the second outlet fin 2112 are not parallel to the center line C but to be inclined at an acute angle. In addition, the first outlet fin 2111 and the second outlet fin 2112 are also inclined to each other at an acute angle.

The outlet fin-pin flow guide 2100 further comprises a third outlet fin 2113 and a fourth outlet fin 2114 that are disposed on different sides with respect to the center line C. The third outlet fin 2113 is disposed at the same side of the first outlet fin 2111, and the fourth outlet fin 2114 is disposed at the same side of the second outlet fin 2112. That is, the third outlet fin 2113 is disposed next to the first outlet fin 2111, and the fourth outlet fin 2114 is disposed next to the second outlet fin 2112. The third outlet fin 2113 is neither parallel to the first outlet fin 2111 nor perpendicular to the first outlet fin 2111, but the third outlet fin 2113 is slanted with respect to the first outlet fin 2111.

The outlet fin-pin flow guide 2100 further comprises a fifth outlet fin 2115 next to the third outlet fin 2113 and a sixth outlet fin 2116 next to the fourth outlet fin 2114. The fifth outlet fin 2115 and the sixth outlet fin 2116 are arranged to be perpendicular to the center line C. The first to sixth outlet fins 2111-2116 change the flow direction of the cooling air as indicated by the arrow A3 such that the cooling air flows upwards from the outlet 1442 to the inlet 1441.

The top fin-pin flow guide 2400 is located between the inlet 1441 and the outlet fin-pin flow guide 2100. The top fin-pin flow guide 2400 comprises a plurality of top fins including a first top fin 2411 and a second top fin 2412. The first top fin 2411 and the second top fin 2412 are disposed at the top portion of the inner transition piece 1410, and each of the first top fin 2411 and the second top fin 2412 is arranged to be slanted with respect to the center line C. Each of the first top fin 2411 and the second top fin 2412 is neither parallel to the center line C nor perpendicular to the center line C. Similar to the bottom fins, the first top fin 2411 and the second top fin 2412 are arranged such that a first distance between a first end 2413 of the first top fin 2411 and a first end 2415 of the second top fin 2412 is larger than a second distance between a second end 2414 of the first top fin 2411 and a second end 2216 of the second top fin 2412. That is, the first top fin 2411 and the second top fin 2412 are arranged to be inclined to each other at an acute angle. The first ends 2413 and 2415 are closer to the inlet 1441 than the second ends 2414 and 2416 are, and the second ends 2414 and 2416 are closer to the outlet 1442 than the first ends 2413 and 2415 are. Therefore, the cooling air supplied from the outlet fin-pin flow guide 2100 is dispersed as indicated by the arrows A4. The first top fin 2411 and the second top fin 2412 are disposed on the opposite sides of the inner transition piece 1410 with respect to the center line C, and the first top fin 2411 and the second top fin 2412 are symmetric to each other against the center line C. The top fin-pin flow guide 2400 further comprises a third top fin 2417 next to the first top fin 2411 and a fourth top fin 2418 next to the second top fin 2412. The third top fin 2417 can be parallel to the first top fin 2411, and the fourth top fin 2418 can be parallel to the second top fin 2412.

The subject invention includes, but is not limited to, the following exemplified embodiments.

Embodiment 1

A transition piece, comprising:
an inner transition piece including an inlet and an outlet;
an outer transition piece surrounding the inner transition piece;

a flow passage between the inner transition piece and the outer transition piece; and an outlet fin-pin flow guide disposed in the flow passage and located closer to the outlet than the inlet, wherein the outlet fin-pin flow guide is slanted with respect to a center line representing an imaginary line between an inlet center of the inlet and an outlet center of the outlet.

Embodiment 2

The transition piece according to embodiment 1, wherein the outlet fin-pin flow guide is in direct physical contact with the inner transition piece.

Embodiment 3

The transition piece according to any of embodiments 1-2, wherein the outlet fin-pin flow guide comprises a first outlet fin and a second outlet fin that are disposed on the inner transition piece and arranged on different sides with respect to the center line.

Embodiment 4

The transition piece according to any of embodiments 1-3, wherein the outlet fin-pin flow guide comprises a third outlet fin and a fourth outlet fin that are disposed on the inner transition piece and arranged on the different sides with respect to the center line.

Embodiment 5

The transition piece according to any of embodiments 1-4, wherein the first outlet fin and the second outlet fin are symmetric to each other, the third outlet fin and the fourth outlet fin are symmetric to each other, and the third outlet fin is slanted with respect to the first outlet fin.

Embodiment 6

The transition piece according to any of embodiments 1-5, further comprising a top fin-pin flow guide disposed at a top portion of the inner transition piece, wherein the top fin-pin flow guide is disposed between the inlet and the outlet fin-pin flow guide.

Embodiment 7

The transition piece according to embodiment 6, wherein the top fin-pin flow guide comprises a first top fin and a second top fin, and the first top fin and the second top fin are arranged such that a first distance between a first end of the first top fin and a first end of the second top fin is larger than a second distance between a second end of the first top fin and a second end of the second top fin.

Embodiment 8

The transition piece according to any of embodiments 1-7, further comprising a bottom fin-pin flow guide disposed at a bottom portion of the inner transition piece.

Embodiment 9

The transition piece according to embodiment 8, wherein the bottom fin-pin flow guide comprises a first bottom fin and a second bottom fin, and the first bottom fin and the second bottom fin are arranged such that a first distance between a first end of the first bottom fin and a first end of the second bottom fin is larger than a second distance between a second end of the first bottom fin and a second end of the second bottom fin.

Embodiment 10

The transition piece according to any of embodiments 8-9, further comprising a side fin-pin flow guide disposed at a side portion of the inner transition piece, wherein the side fin-pin flow guide comprises a plurality of side fins, and each of the plurality of side fins is arranged in a direction from the bottom fin-pin flow guide to the outlet fin-pin flow guide.

Embodiment 11

The transition piece according to any of embodiments 1-10, wherein the outlet fin-pin flow guide comprises a fifth outlet fin and a sixth outlet fin that are arranged to be perpendicular to the center line C.

Embodiment 12

The transition piece according to any of embodiments 7-11, further comprising a third top fin parallel to the first top fin and a fourth top fin parallel to the second top fin.

Embodiment 13

The transition piece according to any of embodiments 9-12, further comprising a third bottom fin parallel to the first bottom fin and a fourth bottom fin parallel to the second bottom fin.

Embodiment 14

The transition piece according to any of embodiments 1-13, wherein the outer transition piece comprises a plurality of holes.

Embodiment 15

The transition piece according to embodiment 14, wherein a first density of the plurality of holes at a region corresponding to the top fin-pin flow guide is lower than a second density of the plurality of holes at a region corresponding to the outlet fin-pin flow guide.

Embodiment 16

A gas turbine, comprising:
a compressor providing compressed air;
a combustor receiving the compressed air and producing combusted gas; and
a turbine receiving the combusted gas from the combustor,
wherein the combustor includes the transition piece according to any of embodiments 1-15,
wherein the transition piece is disposed between a combustion chamber of the combustor and the turbine, and
wherein the inlet of the transition piece receives the combusted gas from the combustion chamber and the outlet of the transition piece provides the combusted gas to the turbine.

Embodiment 101

A transition piece, comprising:
an inner transition piece including an inlet and an outlet;
an outer transition piece surrounding the inner transition piece with a flow passage;
an outlet fin-pin flow guide disposed on the inner transition piece and located closer to the outlet than the inlet;
a first bottom fin disposed at a bottom portion of the inner transition piece; and
a second bottom fin disposed at the bottom portion of the inner transition piece,
wherein the first bottom fin and the second bottom fin are arranged to be inclined to each other at an acute angle.

Embodiment 102

The transition piece according to embodiment 101, wherein a first distance between a first end of the first bottom fin and a first end of the second bottom fin is larger than a second distance between a second end of the first bottom fin and a second end of the second bottom fin.

Embodiment 103

The transition piece according to any of embodiments 101-102, wherein the outlet fin-pin flow guide comprises a first outlet fin and a second outlet fin that are arranged to be inclined to each other at an acute angle.

Embodiment 104

The transition piece according to embodiment 103, wherein the outlet fin-pin flow guide comprises a third outlet fin disposed next to the first outlet fin and a fourth outlet fin disposed next to the second outlet fin.

Embodiment 105

The transition piece according to embodiment 104, further comprising a side fin-pin flow guide disposed at a side portion of the inner transition piece between at least one of the first and second bottom fins and at least one of the first outlet fin to the fourth outlet fin.

Embodiment 106

The transition piece according to any of embodiments 101-105, further comprising a top fin-pin flow guide disposed at a top portion of the inner transition piece, wherein the top fin-pin flow guide is disposed between the inlet and the outlet fin-pin flow guide.

Embodiment 107

The transition piece according to any of embodiment 106, wherein the top fin-pin flow guide comprises a first top fin and a second top fin, and the first top fin and the second top fin are arranged to be inclined to each other at an acute angle.

Embodiment 108

The transition piece according to any of embodiment 107, wherein the top fin-pin flow guide comprises a third top fin parallel to the first top fin and a fourth top fin parallel to the second top fin.

Embodiment 109

A gas turbine, comprising:
a compressor providing compressed air;
a combustor receiving the compressed air and producing combusted gas; and
a turbine receiving the combusted gas from the combustor,
wherein the combustor includes the transition piece according to any of embodiments 101-108,
wherein the transition piece is disposed between a combustion chamber of the combustor and the turbine, and
wherein the inlet of the transition piece receives the combusted gas from the combustion chamber and the outlet of the transition piece provides the combusted gas to the turbine.

Embodiment 201

A transition piece, comprising:
an inner transition piece including an inlet and an outlet;
an outer transition piece surrounding the inner transition piece;
an outlet fin-pin flow guide disposed on the inner transition piece and located closer to the outlet than the inlet; and
a top fin-pin flow guide disposed at a top portion of the inner transition piece,
wherein the top fin-pin flow guide is disposed between the inlet and the outlet fin-pin flow guide.

Embodiment 202

The transition piece according to embodiment 201, further comprising a bottom fin-pin flow guide disposed at a bottom portion of the inner transition piece.

Embodiment 203

The transition piece according to embodiment 202, further comprising a side fin-pin flow guide disposed at a side portion of the inner transition piece, wherein the side fin-pin flow guide is arranged in a direction from the bottom fin-pin flow guide to the outlet fin-pin flow guide.

Embodiment 204

A gas turbine, comprising:
a compressor providing compressed air;
a combustor receiving the compressed air and producing combusted gas; and
a turbine receiving the combusted gas from the combustor,
wherein the combustor includes the transition piece according to any of embodiments 201-203,
wherein the transition piece is disposed between a combustion chamber of the combustor and the turbine, and
wherein the inlet of the transition piece receives the combusted gas from the combustion chamber and the outlet of the transition piece provides the combusted gas to the turbine.

Embodiment 301

A transition piece, comprising:
an inner transition piece including an inlet and an outlet;
an outer transition piece surrounding the inner transition piece;

a plurality of fin-pin flow guides disposed on the inner transition piece, wherein the plurality of fin-pin flow guides are arranged to be inclined to each other at an acute angle.

Embodiment 302

The transition piece according to embodiment 301, wherein the plurality of fin-pin flow guides are disposed at a bottom portion of the inner transition piece.

Embodiment 303

The transition piece according to embodiment 301, wherein the plurality of fin-pin flow guides are disposed at a top portion of the inner transition piece.

Embodiment 304

The transition piece according to embodiment 301, wherein the plurality of fin-pin flow guides are located closer to the outlet than the inlet.

Embodiment 305

The transition piece according to any of embodiments 301-304, further comprising a side fin-pin flow guide disposed at a side portion of the inner transition piece.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A transition piece, comprising:
an inner transition piece including an inlet and an outlet and having a center line representing an imaginary line between an inlet center of the inlet and an outlet center of the outlet;
an outer transition piece surrounding the inner transition piece to form a flow passage in which cooling air flows between the inner transition piece and the outer transition piece; and
a plurality of fin-pin flow guides disposed in the flow passage and configured to redirect and redistribute a flow of the cooling air in the flow passage, each of the plurality of fin-pin flow guides formed of a symmetric arrangement of fin-pins having opposite slants with respect to the center line, the plurality of fin-pin flow guides including:
an outlet fin-pin flow guide located closer to the outlet than the inlet,
a bottom fin-pin flow guide disposed at a bottom portion of the inner transition piece, and
a side fin-pin flow guide disposed at a side portion of the inner transition piece and configured to guide the flow of the cooling air from the bottom fin-pin flow guide to the outlet fin-pin flow guide.

2. The transition piece according to claim 1, wherein the outlet fin-pin flow guide is in direct physical contact with the inner transition piece.

3. The transition piece according to claim 1, wherein the outlet fin-pin flow guide comprises a first outlet fin and a second outlet fin that are disposed on the inner transition piece and arranged on different sides with respect to the center line.

4. The transition piece according to claim 3, wherein the outlet fin-pin flow guide comprises a third outlet fin and a fourth outlet fin that are disposed on the inner transition piece and arranged on the different sides with respect to the center line.

5. The transition piece according to claim 4, wherein the first outlet fin and the second outlet fin are symmetric to each other, the third outlet fin and the fourth outlet fin are symmetric to each other, and the third outlet fin is slanted with respect to the first outlet fin.

6. The transition piece according to claim 1, further comprising a top fin-pin flow guide disposed at a top portion of the inner transition piece, wherein the top fin-pin flow guide is disposed between the inlet and the outlet fin-pin flow guide.

7. The transition piece according to claim 6, wherein the top fin-pin flow guide comprises a first top fin and a second top fin, and the first top fin and the second top fin are arranged such that a first distance between a first end of the first top fin and a first end of the second top fin is larger than a second distance between a second end of the first top fin and a second end of the second top fin.

8. The transition piece according to claim 1, wherein the bottom fin-pin flow guide comprises a first bottom fin and a second bottom fin, and the first bottom fin and the second bottom fin are arranged such that a first distance between a first end of the first bottom fin and a first end of the second bottom fin is larger than a second distance between a second end of the first bottom fin and a second end of the second bottom fin.

9. A transition piece, comprising:
an inner transition piece including an inlet and an outlet;
an outer transition piece surrounding the inner transition piece; and
a plurality of fin-pin flow guides formed on the inner transition piece and configured to redirect and redistribute a flow of cooling air over the inner transition piece, each of the plurality of fin-pin flow guides formed of a symmetric arrangement of fin-pins having opposite slants, the plurality of fin-pin flow guides including:
an outlet fin-pin flow guide located closer to the outlet than the inlet;
a bottom fin-pin flow guide formed on a bottom portion of the inner transition piece, the symmetric arrangement of fin-pins of the bottom fin-pin flow guide including a first bottom fin formed on a first side of the bottom portion and a second bottom fin formed on a second side of the bottom portion opposite to the first side; and
a side fin-pin flow guide formed on a side portion of the inner transition piece and configured to guide the flow of the cooling air from the first and second bottom fins to the outlet fin-pin flow guide.

10. The transition piece according to claim 9, wherein a first distance between a first end of the first bottom fin and a first end of the second bottom fin is larger than a second distance between a second end of the first bottom fin and a second end of the second bottom fin.

11. The transition piece according to claim 10, wherein the outlet fin-pin flow guide comprises a first outlet fin and a second outlet fin that are arranged to be inclined to each other at an acute angle.

12. The transition piece according to claim 11, wherein the outlet fin-pin flow guide comprises a third outlet fin disposed next to the first outlet fin and a fourth outlet fin disposed next to the second outlet fin.

13. The transition piece according to claim 12, further comprising a side fin-pin flow guide disposed at a side portion of the inner transition piece between at least one of the first and second bottom fins and at least one of the first outlet fin to the fourth outlet fin.

14. The transition piece according to claim 13, further comprising a top fin-pin flow guide disposed at a top portion of the inner transition piece, wherein the top fin-pin flow guide is disposed between the inlet and the outlet fin-pin flow guide.

15. A gas turbine, comprising:
a compressor providing compressed air;
a combustor receiving the compressed air and producing combusted gas;
and a turbine receiving the combusted gas from the combustor,
wherein the combustor includes the transition piece according to claim 9,
wherein the transition piece is disposed between a combustion chamber of the combustor and the turbine, and
wherein the inlet of the transition piece receives the combusted gas from the combustion chamber and the outlet of the transition piece provides the combusted gas to the turbine.

16. A transition piece, comprising:
an inner transition piece including an inlet and an outlet;
an outer transition piece surrounding the inner transition piece; and
a plurality of fin-pin flow guides formed on the inner transition piece and configured to redirect and redistribute a flow of cooling air over the inner transition piece, each of the plurality of fin-pin flow guides formed of a symmetric arrangement of fin-pins having opposite slants, the plurality of fin-pin flow guides including:
a bottom fin-pin flow guide formed on a bottom portion of the inner transition piece;
a side fin-pin flow guide formed on a side portion of the inner transition piece;
an outlet fin-pin flow guide located closer to the outlet than the inlet; and
a top fin-pin flow guide disposed between the inlet and the outlet fin-pin flow guide,
wherein the plurality of fin-pin flow guides is further configured to
guide the flow of the cooling air from the bottom fin-pin flow guide to the side fin-pin flow guide,
guide the flow of the cooling air from the side fin-pin flow guide to the outlet fin-pin flow guide, and
guide the flow of the cooling air from the outlet fin-pin flow guide to the top fin-pin flow guide.

\* \* \* \* \*